(12) United States Patent
Teicher et al.

(10) Patent No.: US 7,114,030 B2
(45) Date of Patent: Sep. 26, 2006

(54) SYSTEM, APPARATUS AND METHOD FOR SHARING MEDIA

(75) Inventors: Mordechai Teicher, Hod Hasharon (IL); Aran Ziv, Herzylia (IL); Eyal Bychkov, Hod Hasharon (IL)

(73) Assignee: msystems Ltd., Kfar Saba (IL)

( * ) Notice: Subject to any disclaimer, the term of this patent is extended or adjusted under 35 U.S.C. 154(b) by 0 days.

(21) Appl. No.: 11/078,353

(22) Filed: Mar. 14, 2005

(65) Prior Publication Data

US 2005/0210195 A1    Sep. 22, 2005

Related U.S. Application Data

(60) Provisional application No. 60/556,134, filed on Mar. 18, 2004.

(51) Int. Cl.
*G06F 12/00* (2006.01)

(52) U.S. Cl. ...................... 711/115; 710/305

(58) Field of Classification Search ............... 710/105, 710/301, 302, 313, 314, 316; 711/115
See application file for complete search history.

(56) References Cited

U.S. PATENT DOCUMENTS

| | | | | |
|---|---|---|---|---|
| 5,784,581 A * | 7/1998 | Hannah | ...................... | 710/110 |
| 6,732,218 B1 * | 5/2004 | Overtoom et al. | .......... | 710/313 |
| 6,799,719 B1 * | 10/2004 | Peng | .......................... | 235/375 |
| 2004/0088449 A1 * | 5/2004 | Sakaki | ........................ | 710/15 |
| 2004/0189808 A1 * | 9/2004 | Tanaka | .................... | 348/207.1 |

* cited by examiner

*Primary Examiner*—Nasser Moazzami
(74) *Attorney, Agent, or Firm*—Mark M. Friedman (57) ABSTRACT

A digital appliance, such as a digital camera, an MP3 player or a digital voice recorder, uses a memory card to store data. The appliance and the card use USB interfaces for appliance-card communication. When the appliance is connected to a host computer directly or via a passive USB cable, a switch within the appliance automatically establishes host-card communication for reading and/or writing data. In another embodiment, the switch can also connect the host to the appliance for configuration or operation. In another embodiment, the memory card temporarily stores data to be exchanged between the host and the appliance.

7 Claims, 7 Drawing Sheets

SYSTEM, APPARATUS AND METHOD FOR SHARING MEDIA

CROSS REFERENCE TO RELATED APPLICATION

This application claims the benefit of Provisional Patent Application 60/556,134 filed on 18 Mar. 2004.

BACKGROUND OF THE INVENTION

The present invention relates to storage devices for digital appliances, and in particular to storage devices that are connectable through the Universal Serial Bus (USB) protocol.

Flash memories are used to store digital content in a variety of digital appliances, such as digital cameras, portable music players, digital voice recorders, handheld computers and cellular telephones. In some cases, a flash memory is permanently fixed within the appliance, and in other cases a flash memory module is removable from the appliance.

Many digital appliances interface with a personal computer (PC) to exchange data. One may wish to upload picture files from his digital camera, download music files to his portable music player, or synchronize the address book between his PC and his handheld computer or cellular telephone. When the data is stored in a removable memory module, users are often offered the choice between connecting the appliance to their PC via a cradle, cable or wireless interface in order to communicate with the memory module, or removing the memory module from the appliance and connecting it to the PC through an appropriate connector or adapter.

Flash memory modules are characterized by proprietary form factors and interfaces to operate with compatible appliances. Flash memory modules marketed under commercial names such as Smart Media, Compact Flash, Secure Digital, Multimedia Card or Memory Stick, feature different form factors and electrical interfaces, and manufacturers of commercial appliances select a specific type of flash memory module for interfacing with each appliance. On the other hand, the common PC data interfaces, such as serial or parallel ports, universal serial bus (USB) or Firewire, are incompatible with the interfaces commonly used by the appliances and memory modules, and therefore special adapters are required for connecting a memory module to a PC.

Figure 1:
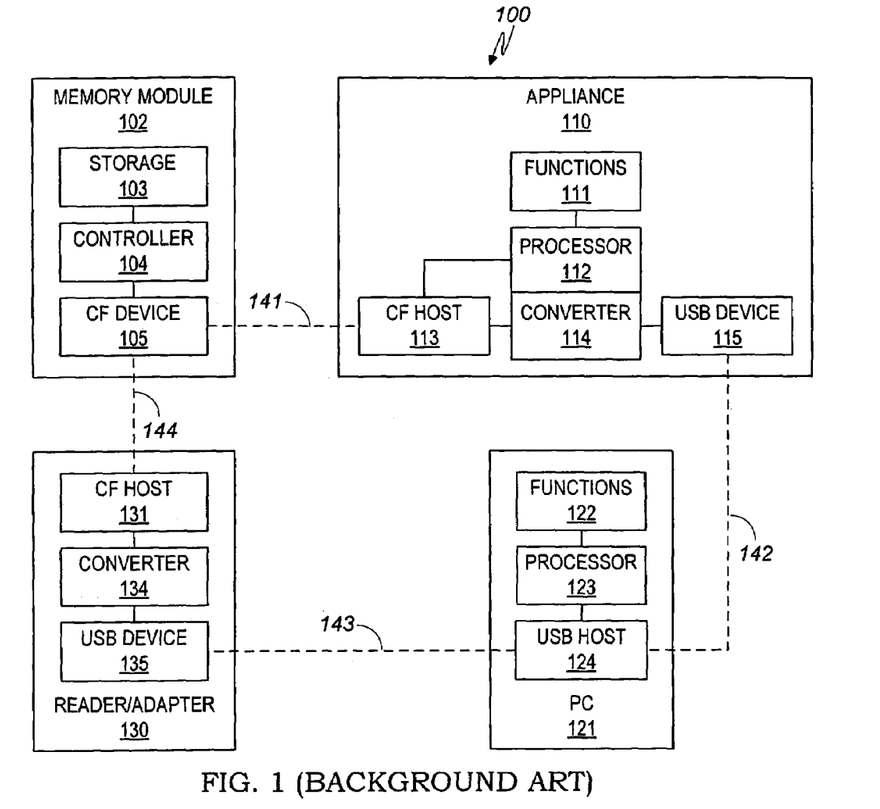
FIG. 1 is a simplified block diagram of a prior art system related to the present invention.

Reference is now made to FIG. 1, a simplified system drawing of background art. When a digital appliance 110 accommodating a permanent or removable memory module 102 is connected to a personal computer PC 121, appliance 110 usually has two interfaces—one interface with PC 121, e.g. USB device interface 115 and the second interface with memory module 102, e.g. Compact Flash (CF) 113—and a protocol converter 114 in order to channel data between the two incompatible interfaces 115 and 113.

Digital appliance 110, such as a digital camera, MP3 music player, voice recorder, handheld computer or cellular telephone, is controlled by processor 112 to operate the appliance's functions module 111. Functions module 111 include all the components, controls and software for executing the appliance-related functionalities such as taking pictures, replaying music, recording voice, etc. CompactFlash host interface 113 (or an alternative proprietary interface such as SmartMedia, MemoryStick, SecureDigital etc.,) is included in digital appliance 110 for exchanging data with memory module 102 via link 141. Universal Serial Bus (USB) device interface 115 is used for connecting appliance 110 and PC 121 through dumb cable 142. The purpose for connecting PC 121 to digital appliance 110 is actually for the PC to exchange data with memory module 102, using cable 142 to interface, e.g USB device 115 and link 141 to interface 113 (e.g. CF host interface); since the protocol, and possibly also the electrical characteristics of interface 115 and interface 113, are different, converter 114 is required to enable the data exchange between PC 121 and memory module 102. Converter 114 can be a standalone component, or form part of processor 112.

Memory module 102 includes CompactFlash device interface 105, flash storage 103, and controller 104 which manages read/write operations related to storage 103. When memory module 102 is inserted into digital appliance 110, memory module 102 exchanges data with processor 112 via compactFlash device interface 105, link 141 and CompactFlash host interface 113. Still inserted in digital appliance 110, memory module 102 can exchange data with PC 121 via link 141, CompactFlash device interface 113, converter 114, USB device interface 115, link 142, and USB host interface 124. Alternatively, memory module 102 can be removed from digital appliance 110 and inserted into reader/adapter 130, to communicate with PC 121 through CompactFlash device interface 105, link 144, CompactFlash host interface 131, converter 134, USB device interface 135, link 143, and USB host interface 124.

Reader/adapter 130 is a peripheral device of PC 121 to receive memory module 102. A variety of such devices for receiving CompactFlash, SmartMedia, SecureDigital, MultimediaCard and/or MemoryStick cards are available in the market. Reader/adapter 130 is connected to PC 121 via cable 143 through USB interfaces 124 and 135, and uses converter 134 to enable data exchange with memory module 102 through card interfaces 105 and 131 via contact link 144.

PC 121 is a general-purpose personal computer, that may upload and/or download data onto/from memory module 102 in cooperation with well-known applications of appliance 110 such as music player, digital camera or cellular telephone.

Figure 2:
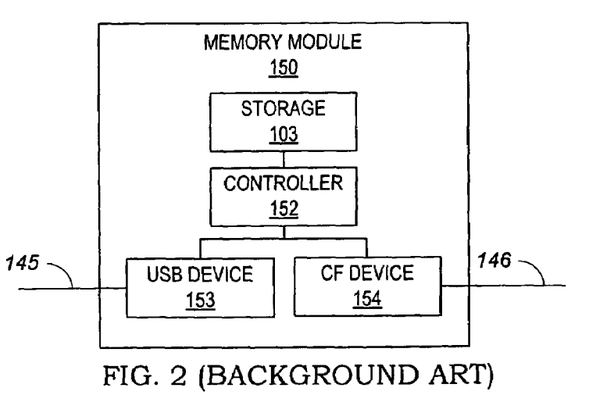
FIG. 2 is a simplified block diagram of a prior art memory module related to the present invention.

To facilitate the connection between flash memory module 102 and PC 121, some vendors have introduced a dual-interface memory module illustrated in FIG. 2 (background art). For example, Lexar Media, Inc. markets a Compact Flash memory card that includes a complete Compact Flash interface 154 that operates when the device is inserted into a compatible appliance, and a USB interface 153 that requires just a dumb cable in order to connect to and exchange data with PC 121, after being removed from a digital appliance.

The use of dual interfaces in appliance 110 and in some memory modules, i.e. module 150, as well as the need for protocol conversion at the appliance, all add to the complexity and cost of the current digital appliances and removable flash memory modules.

There is thus a need and it would be advantageous to have a storage device which communicates directly with both the appliance and an external host device, using a single communication protocol and without protocol converters or external readers.

BRIEF SUMMARY OF THE INVENTION

The present invention provides a storage device which communicates directly with both the appliance and an external host device, using a single communication protocol and obviating the need for protocol converters or external readers.

Another object of the present invention is to allow data exchange between a digital appliance and a personal computer through temporarily depositing the data in a storage device.

Still another object of the present invention is adding a control option for a host over an appliance, in addition to the data exchange described above.

It will be appreciated that the term "interface" used throughout this specification focuses on electrical and protocol aspects, while the physical aspects, such as cables, sockets and plugs, are related to as "links" or "dumb cables". Dumb cable is a passive collection of wires and contact points with no logic or power supply. A link can use also a wireless communication technology, such as Bluetooth, which will be considered as dumb is the sense that the active parts of the link are transparent with respect to the communication channel.

The term "interoperable" as used herein pertains to components that work together or communicate.

The term "exchanging data" as used herein refers to reading and/or writing data, typically alternating between reading and writing data.

According to the present invention there is provided, a computerized appliance removably connectable to a host, including: (a) a processor;(b) a memory module having a universal serial bus interface, the memory module interoperable with the processor in a first functional mode and the memory module further interoperable with the host in a second functional mode; (c) a second universal serial bus interface for inter-operating with the memory module through the universal serial bus interface and (d)a switch which operatively connects the memory module to the processor through the universal serial bus interface when the appliance is disconnected from the host thereby enabling the first functional mode; the switch operatively connecting the memory module to the host through the universal serial bus interface when the appliance is connected to the host thereby enabling the second functional mode. Preferably, the second universal serial bus interface is a dual-role device interface for inter-operating with the memory module through the universal serial bus interface, the dual-role device functional for operating the appliance by the host. Preferably, the memory module is permanently attached to the appliance operation or the memory module is removably attachable to the appliance.

According to the present invention there is provided a method for sharing a storage medium between a host and a computerized appliance, the storage medium included in a memory module. The method includes (a) providing the memory module with a first universal serial bus interface, providing the host with a second universal serial bus interface and providing the appliance with a third universal bus interface. While the appliance is disconnected from the host, the memory module is switched to connect to the appliance and data is exchanged between the appliance and the memory module using the first interface and the third interface. While the appliance is connected the host, the memory module is switched to connect to the host and data is exchanged between the host and the memory module using the second interface and the first interface. Preferably, while the appliance is connected to the host,the appliance is switched to connect to the host and an action is performed for controlling the appliance by the host. Preferably, the switching of the appliance to connect to the host is subsequent to the host instructing the memory module to switch off.

According to the present invention, there is provided a system for sharing a storage medium, the system includes (a) a memory module which stores data in the storage medium, the memory module having a first universal serial bus interface for exchanging data; (b) a host including a second universal serial bus interface operable for exchanging data; and (c) an appliance including a third universal bus interface for exchanging data, and a switch which operatively connects the first interface to the third interface when the host is disconnected from the appliance, and the switch operatively connects the first interface to the second interface when the host is connected to the appliance. Preferably the system is operative to send first data from the appliance to the host wherein the appliance sends the first data to the memory module while the appliance is disconnected from the host; and then the host receives the first data from the memory module when the appliance is connected to the host. Alternatively, the system is operative to send second data from the host to the appliance wherein: the host sends the second data to the memory module when the appliance is connected to the host; and the appliance receives the second data from the memory module when the appliance is disconnected from the host. Preferably, the third universal bus serial interface is a dual-role device interface for inter-operating with the memory module through the first universal serial bus interface, the dual-role device functional for operating the appliance by the host.

According to the present invention there is provided a system for connecting an appliance to a host, the appliance operative for performing one or more functions, the system including: (a) a memory module having a first universal serial bus interface; (b) a host having a second universal serial bus interface; and (c) an appliance including: (i) a dual-role universal serial bus interface; (ii) a functions module for performing the functions; and (iii) a switch, wherein: when the appliance is disconnected from the host, the switch operationally connects the memory module to the functions module through the first universal bus interface and the dual-role serial bus interface; and when the appliance is connected to the host, then selectably by the host, the switch either: (i) operationally connects the memory module to the host through the first and second universal serial bus interfaces, or (ii) operationally connects the host and the memory module through the second universal bus interface and the dual-role universal bus interface.

BRIEF DESCRIPTION OF SEVERAL VIEWS OF THE DRAWINGS

The present invention will be understood and appreciated more fully from the following detailed description, taken in conjunction with the drawings in which.

DETAILED DESCRIPTION OF THE INVENTION

Figures 3, 3A, 4:
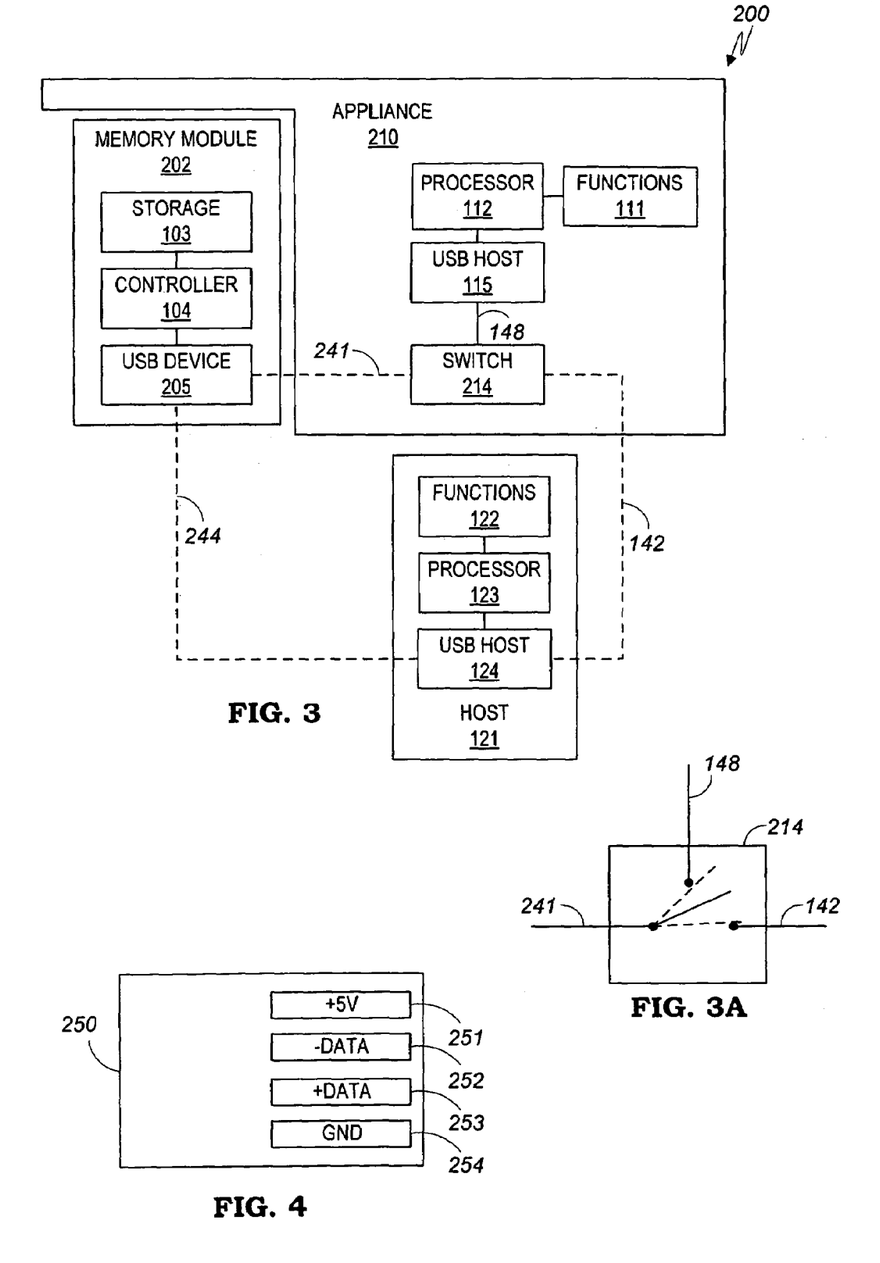
FIG. 3 is a simplified block diagram of the system, according to a preferred embodiment of the present invention.
FIG. 3A is schematic illustration of a switch that forms part of the preferred embodiment of FIG. 3.
FIG. 4 is a simplified pictorial illustration of a USB connector.

Reference is now made to FIG. 3, which describes system 200, a preferred embodiment of the present invention. Compared to prior art system 100 of FIG. 1, system 200 uses only a single type of interface, preferably a USB interface. Reader/adapter 130 is not required, nor is a protocol converter 114 needed. Thus, digital appliance 210 contains functions 111 and processor 112 similar to those of system 100 described in FIG. 1. USB host interface 115 is the only interface needed in appliance 210, and is used for connecting with memory module 202. Switch 214, either mechanical or electronic, selects whether memory module 202 will be connected through link 148 to processor 112 for appliance-related operations, or appliance 210 will be bypassed for providing direct connection between memory module 202 and PC 121 while memory module 202 is physically connected to appliance 210 in a removable or permanent arrangement. In some embodiments, memory module 202 can be removed from appliance 210, and then connected directly to PC 121 via USB device interface 205, link 144, and USB host interface 124. Alternatively, memory module 202 can be fixed within appliance 210, and then connected to PC 121 only via switch 214, thus eliminating the option of link 244, which is then removed from system 200. Link 241 is preferably a direct (plug-to-socket) contact, link 142 is a dumb cable or a wireless data link such as Bluetooth, and optional link 244 is either a direct contact or a dumb cable.

Memory module 202 now features a single USB device interface, which is used for communication in three modes: with appliance 210, with PC 121 when inserted within appliance 210, and optionally, in the removable version of the present invention, with PC 121 after being removed from appliance 210 and connected directly to PC 121.

It will be noted that the components described above are distinguished by their functions and not by their physical layout. Thus, in one exemplary embodiment, switch 214, USB host interface 115, processor 112 and the electronics of appliance functions 111 are implemented as four separate, interconnected electronic components, while in the other extreme they all form part of a single integrated unit. Moreover, in the embodiments where memory module 202 is permanently fixed within appliance 202, some or all of its components can be integrated with the other components of appliance 210, even into a single integrated circuit that includes all the electronic components of appliance 210.

FIG. 3A is an exploded view of switch 214 of FIG. 3.

Switch 214 selectably connects memory module 202 through link 241 to either processor 112 of appliance 210 through link 148, or host 121 through link 142. Switching can be electronic or mechanical. In the case of electronic switching, switch 214, link 148, USB host 115 and processor 112 can be integrated into a single integrated circuit (IC), in which case the operation of switch 214 is preferably controlled by processor 112 in response to the detection of existence or absence of a live link 142.

Reference is now made to FIG. 4, which schematically illustrates the physical wires and contacts 250 of the USB standard, a preferred choice for interfaces 205, 115 and 124 of system 200 (FIG. 3). Contacts 251 and 254 supply power from appliance 210 or PC 121 for operation of memory module 202. Contacts 252 and 253 are used for data transfer. Thus switch 214 switches the connections of at least one of the data channels associated with contacts 252 and 253 disconnecting memory module 202 from appliance 210 and connecting it to PC 121.

Figure 5A:
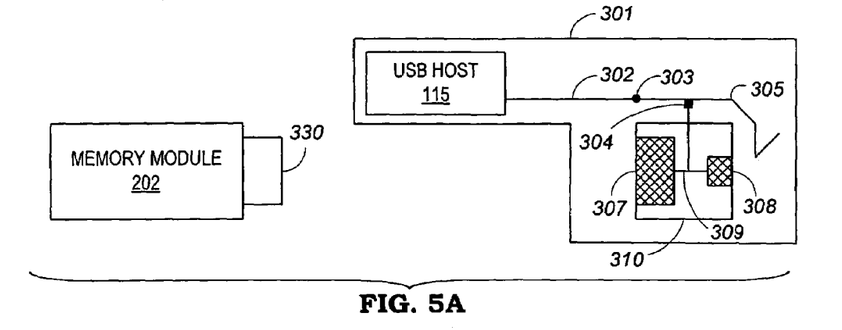
FIGS. 5A–5D are simplified illustrations of connections among devices in accordance to a preferred embodiment of the present invention.

FIGS. 5A–D describe various connection states among digital appliance 210, memory module 202 and PC 121 of FIG. 3. For clarity, switch 214 of FIG. 3 is demonstrated as a mechanical switch. However, an electronic switch, implementing the same logical function as described below, is preferred in many cases. Reference is now made to FIG. 5A, which schematically describes a connection box 301 including switch 214 and forms part of appliance 210 of FIG. 3; and memory module 202 which includes a physical plug 330. Connection box 301 includes connection block 310 with sockets 307 and 308, interconnected by wires 309. Wires 309 are connected to contact points 304. Wires 309 and contact points 304, and other related connections referred to hereinafter, relate to at least data channels 252 and 253 of FIG. 4, and possibly also to power supply connections 251 and 254. Wires 302 are pushed down by pivotal spring 303 toward contact points 304, to physically connect wires 309 to USB interface 115.

Figure 5B:
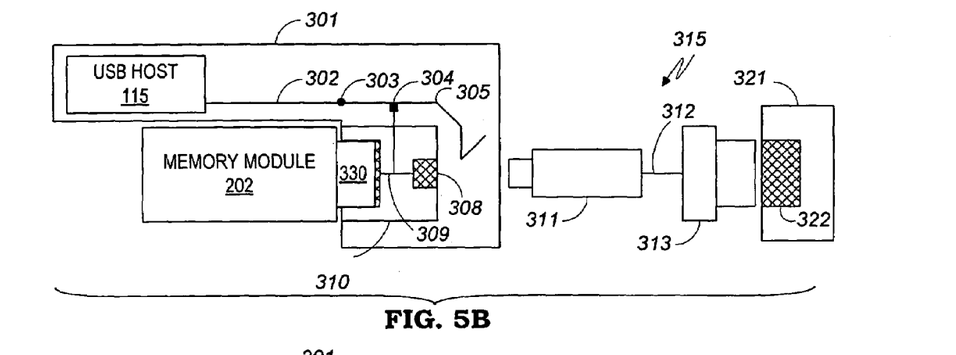

Reference is now made to FIG. 5B, which describes memory module 202 inserted into connection box 301, and connected via plug 330 to USB host interface 115. This configuration relates to the operation mode of appliance 210, whereby memory module 202 operates with processor 112 for providing functions 111. It will be noted that the connection described herein embodies connection 241 of FIG. 3. Also introduced in FIG. 5B is dumb cable 315, which includes a USB mini plug 311, wires 312 and USB plug 313 similar to plug 330. Also introduced is PC connection block 321, which forms part of PC 121, and whose socket 322 is connected to USB interface 124.

Figure 5C:
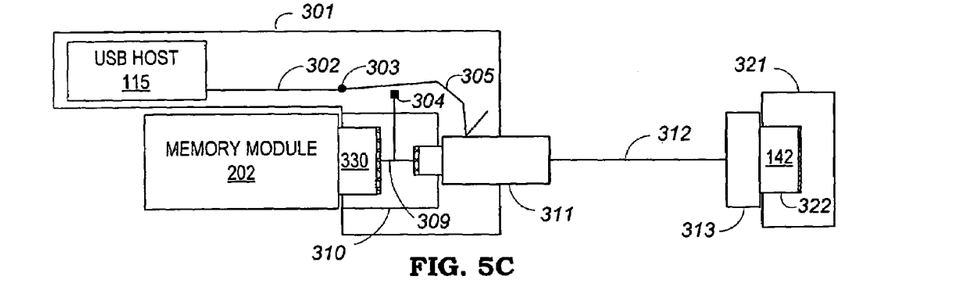

Reference is also made to FIG. 5C, which describes the connections that takes place when dumb cable 315 is plugged into both appliance 210 via connection box 301 and PC 121 via connection box 321. When mini plug 311 is pushed into socket 308, lever 305 is pushed up, and wires 302 are then disconnected from contact points 304, thus disconnecting memory module 202 from appliance 210. On the other hand, mini plug 311, wires 312 and plug 313 now connect memory module 202 to PC 121 via socket 322, thus materializing connection 244 of FIG. 3. Thus, FIG. 5C shows how data exchange between memory module 202 and PC 121 is established by plugging-in dumb cable 315 into both PC 121 and appliance 210. It will be appreciated that when plug 311 is removed from appliance 210, lever 305 will be pushed back to its lower position, reestablishing the connection between memory module 202 and appliance 210.

Figure 5D:
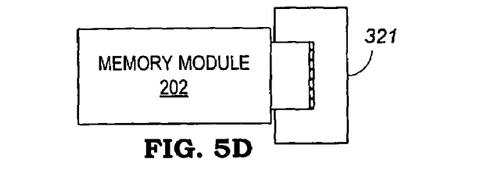

FIG. 5D describe an alternative mode of connection between memory module 202 and PC 121, that does not require dumb cable 315. Memory module 202 is removed from appliance 210 and is plugged directly into socket 322 to establish direct data exchange with PC 121.

Embodiments of the present invention illustrated in FIGS. 5A–D use physical wires for connection and switching. However, as previously mentioned, in alternative embodiments switching at switch 214 can take place electronically, by methods well-known to those skilled in the art, to route the memory module's data communication to PC 121 or appliance 210, in response to detecting whether host 121 is connected to or disconnected from appliance 210, respectively. It will also be appreciate that when the switching is electronic, dumb cable 315 can be replaced by a wireless IR or RF link, to embody link 142 of FIG. 3.

Figure 6:
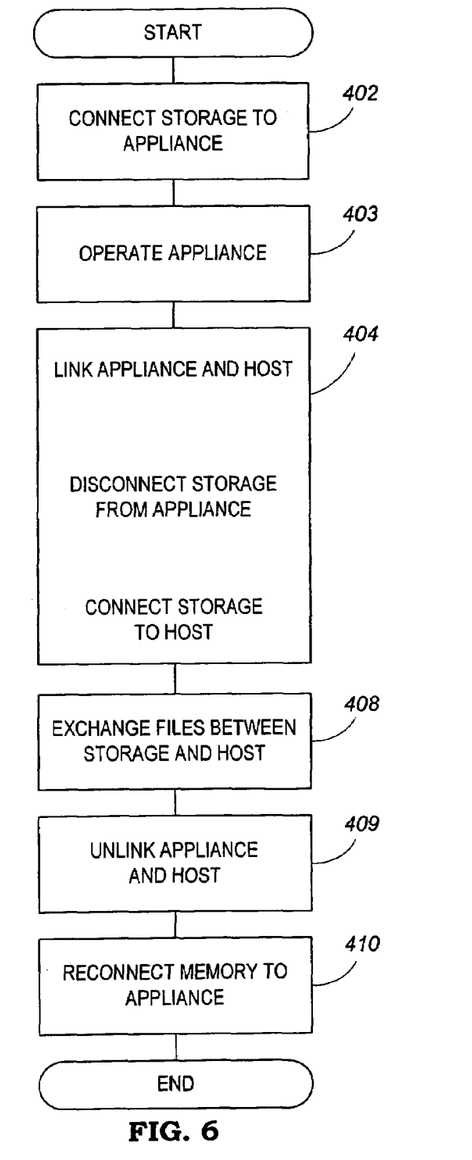
FIG. 6 is a schematic flowchart describing a mode of operation of a preferred embodiment of the present invention.

FIG. 6 describes a first operation mode, typical to appliances such as a digital camera or a voice recorder, where the memory module is first attached to an appliance to acquire data and then connected to a PC for using the data. The procedure starts when memory module 202 and appliance 210 are separate. In step 402, memory module 202 is inserted into and connected to appliance 210 physically, electrically and logically, as described in FIG. 5B. In step 403, appliance 210 is operated to acquire data, for example by taking digital pictures or recording voice messages, and the data is stored in memory module 202. In a step 404 dumb cable 315 is plugged into appliance 210 and PC 121, and as a result, memory module 202 is electrically disconnected from appliance 210, and memory module 202 is connected to PC 121, as illustrated in FIG. 5C. In step 408, PC 121 exchanges files with memory module 202. In step 409 dumb cable 315 is removed from appliance 210, which in step 410 reconnects appliance 210 and memory module 202 for further operation.

Figure 7:
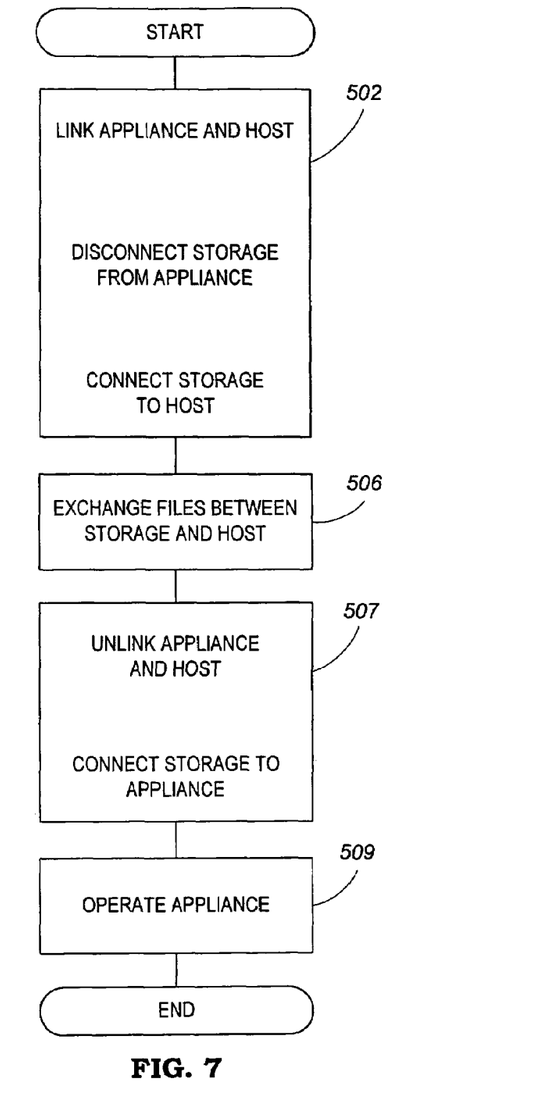
FIG. 7 is a schematic flowchart describing another mode of operation of a preferred embodiment of the present invention.

FIG. 7 describes a second operation mode, typical to appliances such as a music player, where the memory module is first attached to a PC to acquire data and then to an appliance-for using the data. The steps are similar to those of FIG. 6, but the order is different. Thus, the process starts with memory module 202 already inserted in appliance 210. In step 502, dumb cable 315 of FIG. 5B is plugged into appliance 210 and PC 121, which disconnects the memory module from the appliance and connects the memory to the PC, as described in FIG. 5C. In step 506, PC 121 and memory module 202 exchange files, for example by moving music files in MP3 format from the PC to the memory module. In a step 507 dumb cable 315 is disconnected from appliance 210, which reconnects memory module 202 to appliance 210 for operating the appliance in step 509, for example by playing music content stored in memory module 202.

It will be appreciated that the physical and electrical connects and disconnects described with respect to FIGS. 5B–7 above, are accompanied by logical operations at host 121 and appliance 210 that are dependent on the operating systems of PC 121 and appliance 210. Such operations are well know in the art and will not be described herein.

Figure 8:
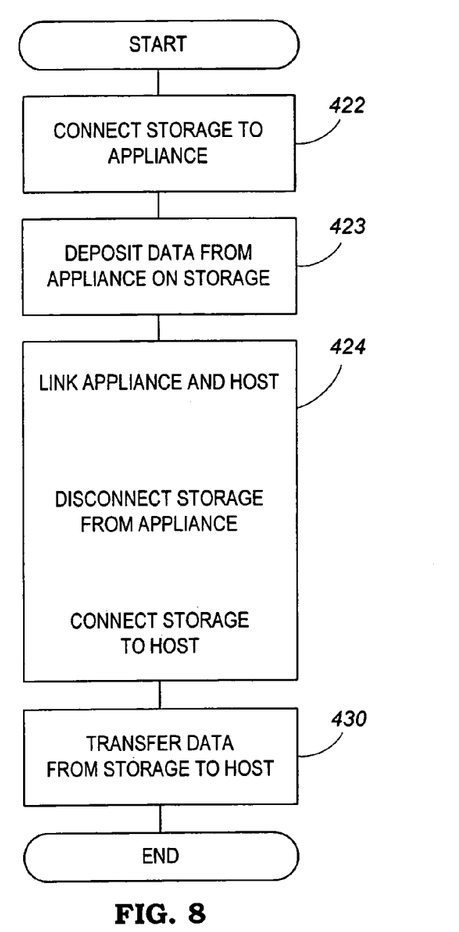
FIG. 8 is a schematic flowchart describing sending data from an appliance to a host through a storage device.
Figure 9:
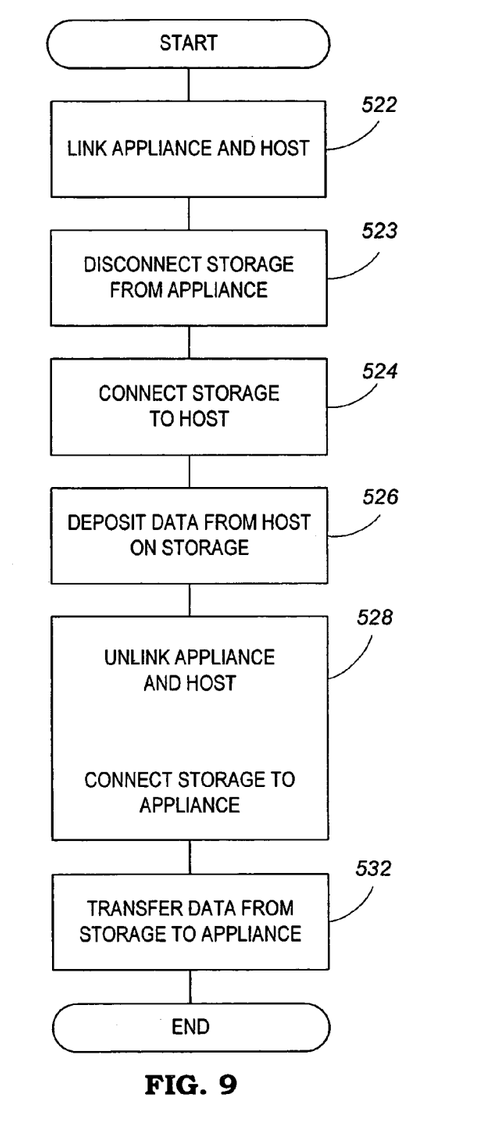
FIG. 9 is a schematic flowchart describing sending data from a host to an appliance through a storage device.

FIGS. 8 and 9 describe a method for exchanging data between appliance 210 and host 121 through a memory card 202, using the teachings of the present invention. Examples for applications for such an exchange include sending configuration or personalization data from host 121 (e.g. a personal computer) to an appliance 210 (e.g. a cellular telephone), or retrieving status information from appliance 210 to host 121 for analysis or reporting. It would be noted that such an exchange is not trivial even when appliance 210 and host 121 are connected through link 142, since both appliance 210 and host 121 feature USB host interfaces 115 and 124, respectively, and the USB standard does not support host-to-host data exchange.

Thus, FIG. 8 describes how data is sent from processor 112 to host 121 of FIG. 3 through memory module 202. In a step 422 memory module 202 is inserted or connected to appliance 210, while host 121 is not connected to appliance 210. In a step 423 the data to be sent to host 121 is copied from processor 112 onto storage 103 thus being temporarily deposited therein. In a step 424 link 142 (FIG. 3) is established between appliance 210 and host 121, thus activating, electronically or mechanically, switch 214 to disconnect link 214 from link 148 and connect link 241 to link 142 instead, i.e. connecting memory module 202 to host 121 instead of processor 112. In a step 430 the data previously deposited in step 423 within storage 103 is now transferred to host 121, thus completing appliance-to-host data transfer.

FIG. 9 describes data transfer in the opposite direction than that of FIG. 8, i.e. from host 121 to processor 112 of FIG. 3 through memory module 202. In step 522 appliance 210 with memory module 202 inserted is connected to host 121 through link 142, causing switch 214 to disconnect storage 103 from appliance processor 112 and connect storage 103 to host 121. In a step 526 the data to be sent to appliance processor 112 is copied from host 121 onto storage 103 thus being temporarily deposited therein. In step 528 link 142 (FIG. 3) is disconnected, thus activating, electronically or mechanically, switch 214 to connect link 241 to link 148, i.e. connecting memory module 202 to appliance processor 112 instead of host 121. In step 532 the data previously deposited in step 526 within storage 103 is now transferred to appliance processor 112, thus completing host-to-appliance data transfer.

Figure 10:
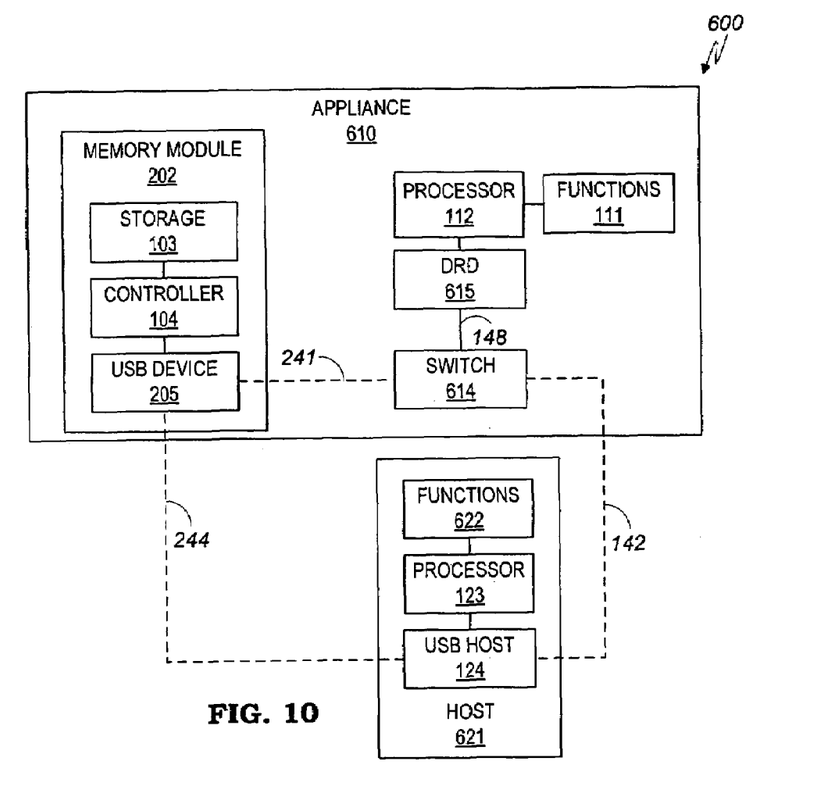
FIG. 10 is a simplified block diagram of the system, according to another preferred embodiment of the present invention.
Figure 11:
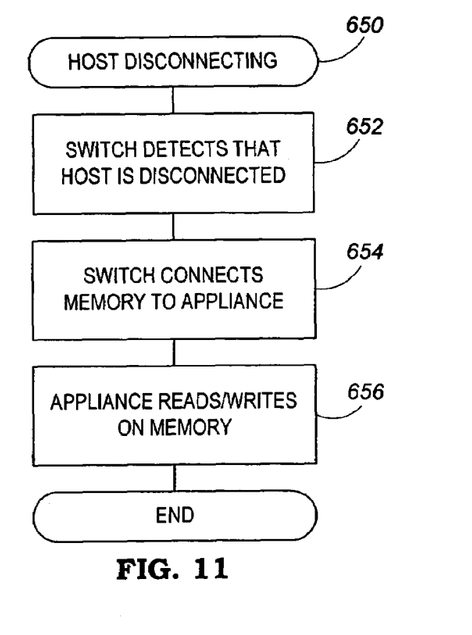
FIG. 11 illustrates a process initiated when a host is disconnected from the system, according to the second embodiment of the present invention.
Figure 12:
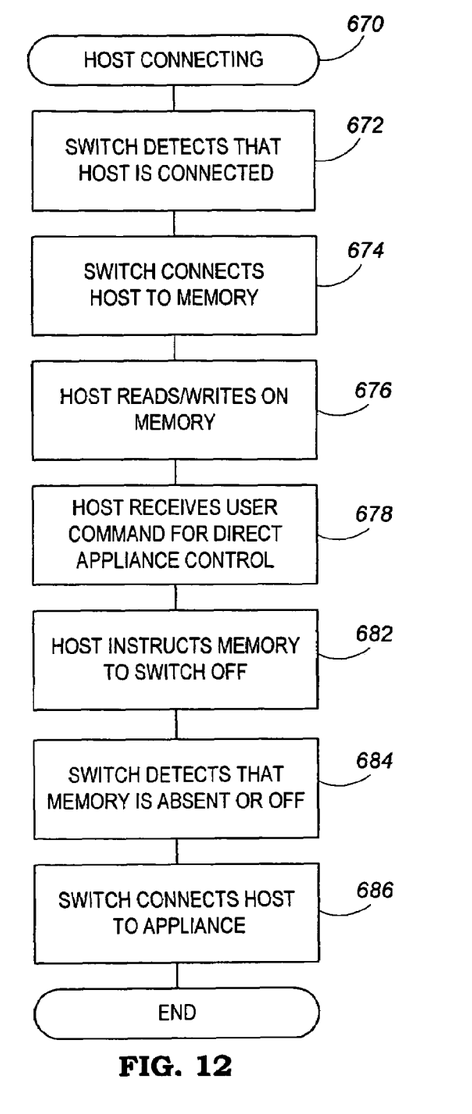
FIG. 12 illustrates a process initiated when a host is connected from the system, according to the second embodiment of the present invention.

FIGS. 10–12 describe an alternative switching arrangement for adding a control option for a host over an appliance, in addition to the data transfer described above.

Thus, FIG. 10 describes an appliance-host system 600 that is similar to system 200 of FIG. 3, with the following differences: (a) appliance 610 is configurable and/or operable from host 621 (for example, a digital camera that can be configured and operated from a personal computer), which is reflected in the programming of processor 112 and functions 111; (b) USB host interface 115 is replaced with a dual role device interface (DRD) 615, such as USB on-the-go (OTG—see http://www.usb.org/developers/onthego/) interface that can function both as a host and a device interface; host 621 includes functions 622 that include configuring and/or operating appliance 610 from the host; and switch 614 has three modes of operation, as described with respect to FIGS. 10A–C below. Switch 614 is electronic or a combined mechanical-electronic switch, for supporting the three-way operation described below.

Figure 10A:
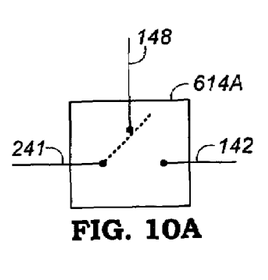
FIG. 10A–10C show three switch states, according to an embodiment of the present invention.
Figure 10B:
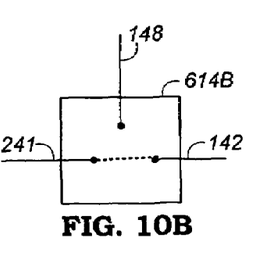
Figure 10C:
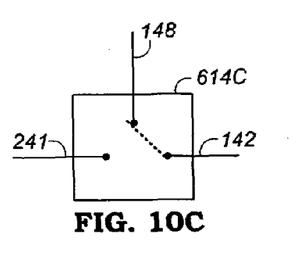

FIGS. 10A–C describe three states of switch 614 of FIG. 10. In state 614A of FIG. 10A, memory module 202 is connected to appliance processor 112 through links 241 and 148, for regular appliance operation, whereby DRD interface 615 functions as a USB host interface. In state 614B of FIG. 10B, memory module 202 is connected to host 621 through links 241 and 142 for data exchange therewith. In state 614C of FIG. 10C, switch 614 connects appliance processor 112 to host 621 through links 142 and 148, whereby DRD interface 615 functions as a USB device interface; in this state host 621 can configure and/or operate processor 112 and functions 111, for example operate a digital camera from a personal computer.

FIGS. 11–12 describe the operation of switch 614 of FIG. 10. FIG. 11 describes a process starting in step 650 by disconnecting host 621 from appliance 610, for example by unplugging a USB cable from appliance 610. In step 652, switch 614 detects that host 621 is disconnected, which results in a step 654 by connecting memory module 202 to appliance processor 112 (state 614A of FIG. 10A). This allows in a step 656 read/write operations by appliance 610 from and onto storage 103 of memory module 202. FIG. 12 describes a process starting in step 670 by connecting host 621 to appliance 610 through link 142. In step 672, switch 614 detects the connection of host 621, and as a result switch 614 connects memory module 202 to host 621 (state 614B of FIG. 10B) allowing read/write operations (a step 676). When the user wishes to operate appliance 610 from host 621, he or she enters a command which is received by host 621 in a step 678, resulting in a command 682 by host 621 to memory module 202 to turn off. In step 684, switch 614 detects that memory module 102 is absent or off, which in step 686 results in switch 614 connecting host 621 to appliance processor 112 for configuration and/or operation (state 614C of FIG. 10C).

It will be noted that steps 682+684 of turning memory module 202 off and then detecting (step 684) by switch 614, is an optional way to operate switch 614 while processor 112 is disconnected from host 621. This way is advantageous in designs wherein switch 614 is unaware of the traffic passing from host 621 to memory module 202. In alternative embodiments wherein switch 614 and/or processor 112 are aware of such traffic, steps 682+684 are replaced by a command from host 621 to switch 614 to move from state 614B to state 614C (FIGS. 10B, 10C, respectively).

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. A system for sharing a storage medium, the system comprising:
   (a) a memory module which stores data in the storage medium, the memory module having a first universal serial bus interface for exchanging data;
   (b) a host including a second universal serial bus interface operable for exchanging data; and
   (c) an appliance including:
      (i) a third universal serial bus interface for exchanging data;
      (ii) a switch which operatively connects said first universal serial bus interface to said third universal serial bus interface when said host is disconnected from said appliance, and said switch operatively connects said first universal serial bus interface to said second universal serial bus interface when said host is connected to said appliance; and wherein the system operates in at least one operative mode selected from the group consisting of:
   (I) sending first data from said appliance to said host, wherein:
      (i) said appliance sends said first data to said memory module while said appliance is disconnected from said host; and
      (ii) said host receives said first data from said memory module when said appliance is connected to said host; and
   (II) sending second data from said host to said appliance, wherein:
      (i) said host sends said second data to said memory module when said appliance is connected to said host; and
      (ii) said appliance receives said second data from said memory module when said appliance is disconnected from said host.

2. The system of claim 1, wherein said third universal serial bus interface is a dual-role device interface for inter-operating with said memory module through said first universal serial bus interface, said dual-role device functional for operating the appliance by the host.

3. The system, according to claim 1, wherein said appliance is selected from the group of portable devices consisting of a digital camera, a portable music player, a digital voice recorder, a handheld computer and a cellular telephone.

4. The system, according to claim 1, wherein said appliance is a digital camera which acquires said first data.

5. The system, according to claim 1, wherein said appliance is a digital voice recorder which acquires said first data.

6. The system, according to claim 1, wherein said appliance is a digital music player which plays said second data.

7. A method for sharing a storage medium between a host and a computerized appliance, the storage medium included in a memory module, the method comprising the steps of:
   (a) providing the memory module with a first universal serial bus interface, providing the host with a second universal, serial bus interface, and providing the appliance with one third universal bus interface;
   (b) while the appliance is disconnected from the host, switching the memory module to connect to the appliance and exchanging data between the appliance and the memory module using said first universal serial bus interface and said third universal serial bus interface;
   (c) while the appliance is connected to the host, switching the memory module to connect to the host and exchanging data between the host and the memory module using said second universal serial bus interface and said first universal serial bus interface; and
   (d) while the appliance is connected to the host, switching the appliance to connect to the host and performing at least one action for controlling said appliance by said host;

wherein said switching the appliance to connect to the host is subsequent to said host instructing said memory module to switch off.

* * * * *